Sept. 30, 1924.
H. H. MARSHALL
AUTOMATIC EXPANSION VALVE
Filed Feb. 21, 1923
1,510,186
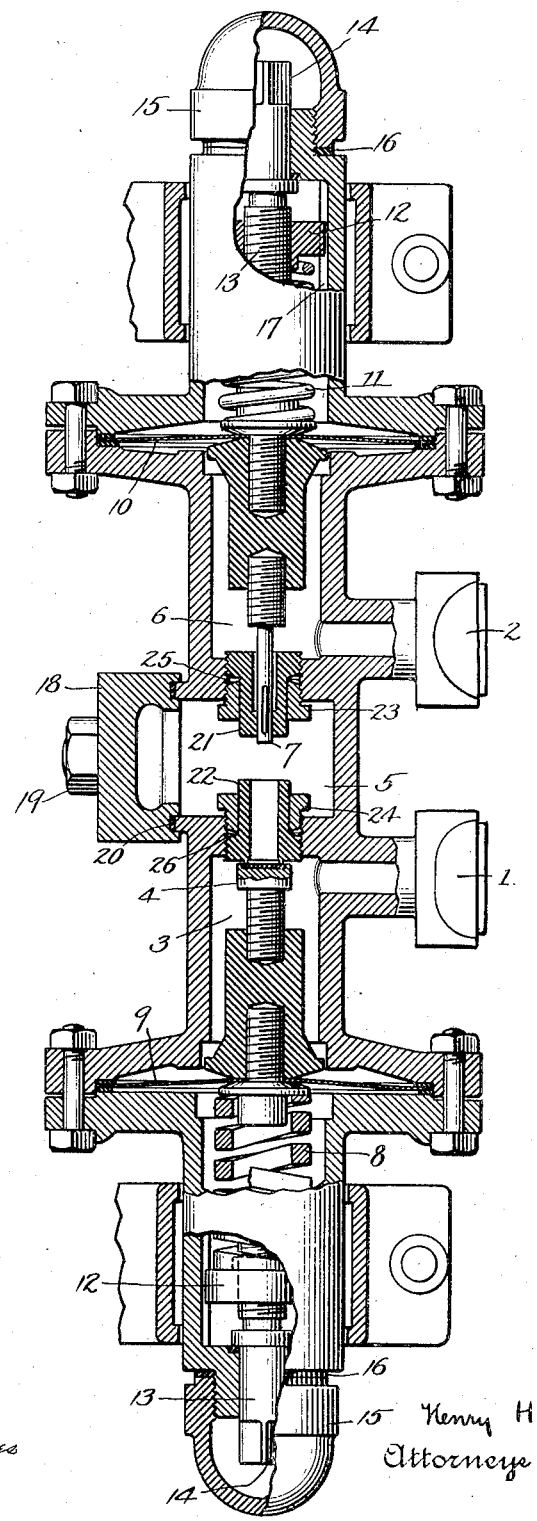
WITNESS
Oliver W. Holmes
Inventor
Henry H. Marshall, by his
Attorneys
Knight Bro.

Patented Sept. 30, 1924.

1,510,186

UNITED STATES PATENT OFFICE.

HENRY H. MARSHALL, OF WEST HARTFORD, CONNECTICUT, ASSIGNOR TO THE AUTOMATIC REFRIGERATING COMPANY, OF HARTFORD, CONNECTICUT, A CORPORATION OF NEW JERSEY.

AUTOMATIC EXPANSION VALVE.

Application filed February 21, 1923. Serial No. 620,450.

*To all whom it may concern:*

Be it known that I, HENRY H. MARSHALL, a citizen of the United States, residing at West Hartford, county of Hartford, and State of Connecticut, have invented certain new and useful Improvements in Automatic Expansion Valves, of which the following is a specification.

My invention relates to automatically controlled expansion valves for restricting the passage of a fluid from a higher to a lower pressure, as for example in the well known expansion valves of refrigerating machines.

As such valves are subjected to more or less erosion by the rapid passage of the fluid, there comes a time, with the construction heretofore used, where one valve serves the double purpose of stop valve and expansion valve, when they are no longer able to completely shut off the fluid, when the operating condition requires closure, in order to prevent the flooding of the refrigeration coils.

The object of my invention is to prevent the further leakage that may occur due to the wear of the expansion valve, by working the expansion valve, only as an expansion valve, and bringing into action a supplemental valve, which is of much larger area than the expansion valve and hence will not be subject to wear and which will at a predetermined fall of the high pressure or rise of the low pressure act as a positive shut-off independently of the expansion valve. With such a protection against flooding, any possible wear due to erosion of the expansion valve can be compensated for by the lessened play of the diaphragm controlling such valve and the wear and tear of such valve becomes unimportant.

Further features of my invention relate to adjusting means for varying the pressure operating on the valves and for assembling and adjusting the valve seats and the various combinations of parts as will be more fully explained hereinafter.

The accompanying drawing shows an embodiment of my invention by a sectional view.

In the drawings is shown at 1, a pipe connection to the high pressure supply from a usual condensing pump and at 2 is shown a similar connection leading to the expansion coils of a refrigerating apparatus. The high pressure pipe communicates with a chamber 3 and in this chamber opening a valve 4 operates to close an opening into an intermediate chamber 5. From the intermediate chamber communication is made with low pressure chamber 6 thru expansion valve 7. The valve 4 is a stop valve that is held against its seat by the action of a spring 8 and is pushed from its seat by a diaphragm 9 when the pressure in chamber 3 is sufficient to overcome the force of the spring 8. A diaphragm 10 operates to close the expansion valve 7 against the action of a spring 11 when the pressure in the low pressure chamber 6 exceeds a certain amount. To adjust and regulate the pressures under which the respective diaphragms and springs shall open and close their valves, I provide nuts 12 which form the back abutments of the springs and are capable of being moved inwardly and outwardly by adjusting screws 13. These screw stems may have their ends squared off as at 14 so that a wrench may be used for adjusting and caps 15 are provided to close in the ends while a gasket 16 insures that the fluid may not escape, nor moisture enter. The nuts 12 are guided by ribs or slots 17 in the casing so that they will not turn with the screw. By making the opening controlled by the stop valve 4 larger than the opening controlled by the expansion valve 7 the pressure in the intermediate chamber 5, when the stop valve is open, will be practically the same as the high pressure in the chamber 3 so that all the expanding and consequently all the wiring-drawing and erosion will take place at the valve 7 and even if this erosion should be so much as to prevent the expansion valve from shutting off the high pressure, it will still act as an expansion valve by a slight adjustment of the screw 13 and as the stop valve 4 will immediately close tight upon a reduction of the pressure in the chamber 3 as occurs for instance, when the compressor is stopped there will ensue no flooding of the low pressure coils connected with pipe 2, although without such stop valve this would be certain to occur. The intermediate chamber has a removable cover 18 secured by bolts 19 and sealed with a lead gasket 20. When this cover is removed access is had to the adjustable valve seats 21 of the expansion valve and 22 of the stop valve with their check nut glands 23 and 24 and lead seals 25, 26. It will be readily understood how the valve seats may be adjusted in any desired way by this means.

While I have shown two embodiments of my invention, there are other possible combinations that may fall within its scope which relates first to the automatic character of the stop valve in series with the expansion valve, and to the relative proportions of the two valves whereby all the expansion or practically all of it is confined to the expansion valve, thus saving the stop valve from deleterious erosion.

I claim:—

1. The combination with an expansion valve of a stop valve on the high pressure side having an opening larger than the expansion valve, means controlled by pressure for opening the stop valve during the normal operation of the expansion valve and for closing the stop valve simultaneously with the closing of the expansion valve.

2. In apparatus of the character described, the combination of an expansion valve and a stop valve with an intermediate chamber, adjustable seats for said valves and a removable cover for said intermediate chamber permitting access to said seats.

3. The combination of an expansion valve controlled by the pressure in the low pressure side and an automatic stop valve controlled by the pressure on the high pressure side with an intermediate chamber between them, the expansion valve having less area than the stop valve so as to avoid wire-drawing of the latter.

4. An expansion valve comprising a high pressure chamber, a low pressure chamber and an intermediate chamber, a stop valve between the high pressure and intermediate chambers, means controlled by the high pressure for opening and closing the same, and an expansion valve between the intermediate and low pressure chambers controlled by the low pressure, the ratio between the area of the two valve being such that the expansion will all take place at the expansion valve.

5. The combination of a valve casing having a high pressure chamber, a low pressure chamber and an intermediate chamber of relatively small capacity, a stop valve between the high and the intermediate chambers and an expansion valve between the intermediate and the low pressure chambers, the stop valve exceeding the dimensions of the expansion valve by an amount sufficient to prevent expansion at the stop valve, and means controlled by pressure for opening the stop valve during the normal operation of the expansion valve and for closing the stop valve simultaneously with the closing of the expansion valve.

6. In an expansion valve of the character described, the combination of an expansion valve and a stop valve with an intermediate chamber, adjustable seats for said valves and a removable cover on said chamber for furnishing access to said adjustable seats.

HENRY H. MARSHALL.